United States Patent
Poo et al.

(10) Patent No.: US 7,711,915 B2
(45) Date of Patent: May 4, 2010

(54) METHOD FOR OVERCOMING SYSTEM ADMINISTRATION BLOCKAGE

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 945 days.

(21) Appl. No.: 11/313,345

(22) Filed: Dec. 20, 2005

(65) Prior Publication Data

US 2006/0136689 A1   Jun. 22, 2006

(30) Foreign Application Priority Data

Dec. 20, 2004   (SG)   ................ 200407554-5

(51) Int. Cl.
G06F 12/00   (2006.01)
G06F 13/00   (2006.01)
G06F 13/28   (2006.01)

(52) U.S. Cl. ................... 711/163; 711/103; 711/153
(58) Field of Classification Search ............ 711/163, 711/103, 153
See application file for complete search history.

(56) References Cited

U.S. PATENT DOCUMENTS 5,598,562 A * 1/1997 Cutler et al. ............. 718/104
6,223,234 B1 * 4/2001 Mahalingam ............ 710/302
6,681,304 B1 * 1/2004 Vogt et al. ............... 711/164
2002/0144033 A1 * 10/2002 Ragland ................... 710/63

FOREIGN PATENT DOCUMENTS

WO   WO 2004/086363 A2   10/2004

OTHER PUBLICATIONS

"Universal Serial Bus Specification," Revision 2.0, Apr. 27, 2000, Bibliographic Details (pp. i-ii); Chapter 2 Terms and Abbreviations Glossary—"bus enumeration" (p. 3); 4.6.3 Bus Enumeration Overview (p. 20), 4.9 USB Host: Hardware and Software—System Software Role (p. 24), 7.2.1.5 Self Powered Functions (p. 174), 9.1.2 Bus Enumeration (p. 243), 10.5.1.1 USBD Initialization (p. 288), and 10.5.4.5 Managing Remote Wakeup Devices (re-enumerating sub trees) (p. 295); Total pp. 9.
Axelson, Jan, "USB Complete, The Developer's Guide, Fourth Edition," Lakeview Research, http://www.lvr.com/usbc.htm, Sep. 18, 2009, pp. 6.
"USB in a NutShell, Making Sense of the USB Standard," Beyond Logic Universal Serial Bus, Apr. 6, 2002, http://www.beyondlogic.org/usbnutshell/usb7.htm, 12 pages.
Answers.com, "Universal Serial Bus," Sep. 18, 2009, http://www.answers.com/topic/universal-serial-bus, 2 pages.
TOMAX7—Digitalsmiles, "Computer Glossary, Acronyms, and Abbreviations," http://www.tomax7.com/aplus/computer_glossary.htm, Sep. 17, 2009, 2 pages.

* cited by examiner

Primary Examiner—Stephen C Elmore
Assistant Examiner—Mark A Giardino, Jr.
(74) Attorney, Agent, or Firm—Blakely, Sokoloff, Taylor & Zafman LLP

(57) ABSTRACT

This invention relates to a method for overcoming system administration blockage and refers particulars, though not exclusively, to a method for overcoming system administrator blockage of a device newly connected to a computer.

17 Claims, 6 Drawing Sheets

METHOD FOR OVERCOMING SYSTEM ADMINISTRATION BLOCKAGE

CROSS-REFERENCE TO RELATED APPLICATIONS

The present patent application claims priority from Singaporean Patent Application No. 200407554-5, filed on Dec. 20, 2004.

FIELD OF THE INVENTION

This invention relates to a method for overcoming system administrator blockage and refers particulars, though not exclusively, to a method for overcoming system administrator blockage of a device newly connected to a computer.

BACKGROUND OF THE INVENTION

When a computer is operating not as part of a network, the computer operator is generally the administrator. Therefore, the user has control over system administration functions. However, when the computer is operating as part of network, be it a local network or a wide area network, the system administrator has control over some of the functions of each computer connected to the network.

In the "WINDOWS"™ operating system, the system administrator has an administrative privilege function to enable the system administrator to block certain services on the computer in which it is operating. The services that can be controlled by the system administrator in this way include directory services, files, printers, security, terminals management, and peripheral devices. This normally includes a blocking function for access to certain devices connected to the computer. For example, if a device with a private memory is connected to the computer, a password will be required to be entered to gain access to the private memory. Normally the password will not be able to be sent to the device, so access will be denied. Therefore, as a result the exercise of the blocking function by the system administrator the "WINDOWS"™ operating system might not be able to communicate with the peripheral or other device operatively connected to the computer.

SUMMARY OF THE INVENTION

According to a first aspect there is provided a method for overcoming system administrator blockage of a device newly-connected to a host computer, operatively connected to a network controllable by a system administrator, the device having a first non-volatile memory comprising a private area, the private area being of a category for which communication by the host computer application is able to blocked in an administrative privilege environment. The method allows the device to be enumerated with the host computer application as a human interface device for enabling communication between the host computer application and the private area in a non-administrative privilege environment.

The communication between the host computer application and the private area may be through a mass storage driver. The device may enumerate itself as the human interface device during the configuration descriptor process. The feature report is used for communication between the device and the host computer operating system. The device preferably reports to the host computer operating system as an alphanumeric display in a usage selected from human interface device usage, and usage page.

The device may be part of a composite device also having a second non-volatile memory comprising a public area. The public area may be able to communicate with the host computer operating system in the non-administrative privilege environment. The composite device may be non-volatile memory external device for operative connection to the host computer. The public area and the private area may comprise a non-volatile memory, preferably a single non-volatile memory.

The device may be selected from: external disk drive, printer, game console, external read/write disk drive, external card reader, external USB hub, external sound card, media player, and MP3 player.

According to a second aspect there is provided a computer usable medium comprising a computer program code that is configured to cause a processor to execute one or more functions for the performance of the above method.

According to a third aspect there is a provided a non-volatile memory device for operative connection to a host computer, and comprising a computer program code that is configured to cause processor of the non-volatile memory device to execute one or more functions for the performance of the above method.

According to a final aspect there is provided a non-volatile memory device comprising a public memory, a private memory, a controller for controlling the public memory and the private memory as well as communication between the host computer and the non-volatile memory device, a connector for enabling connection of the non-volatile memory device to a host computer, and a connector interface. The non-volatile memory device is able to be enumerated to the host application as a composite device including a human interface device for enabling the host computer application to communicate with the private memory. The host computer application may gain access to the private memory through a mass storage driver.

The host computer application system may be able to communicate with the public memory in a non-administrative privilege environment.

The host computer application may be able to communicate with the private memory in a non-administrative privilege environment only after enumeration. The connector may be a USB or IEEE 1394 connector.

The public memory and the private memory may be separate parts of the one memory.

BRIEF DESCRIPTION OF THE DRAWINGS

In order that the invention may be fully understood and readily put into practical effect, there shall now be described by way of non-limitative example only a preferred embodiment of the present invention, the description being with reference to the accompanying illustrative drawings in which.

DETAILED DESCRIPTION OF THE PREFERRED EMBODIMENTS

Figure 1:
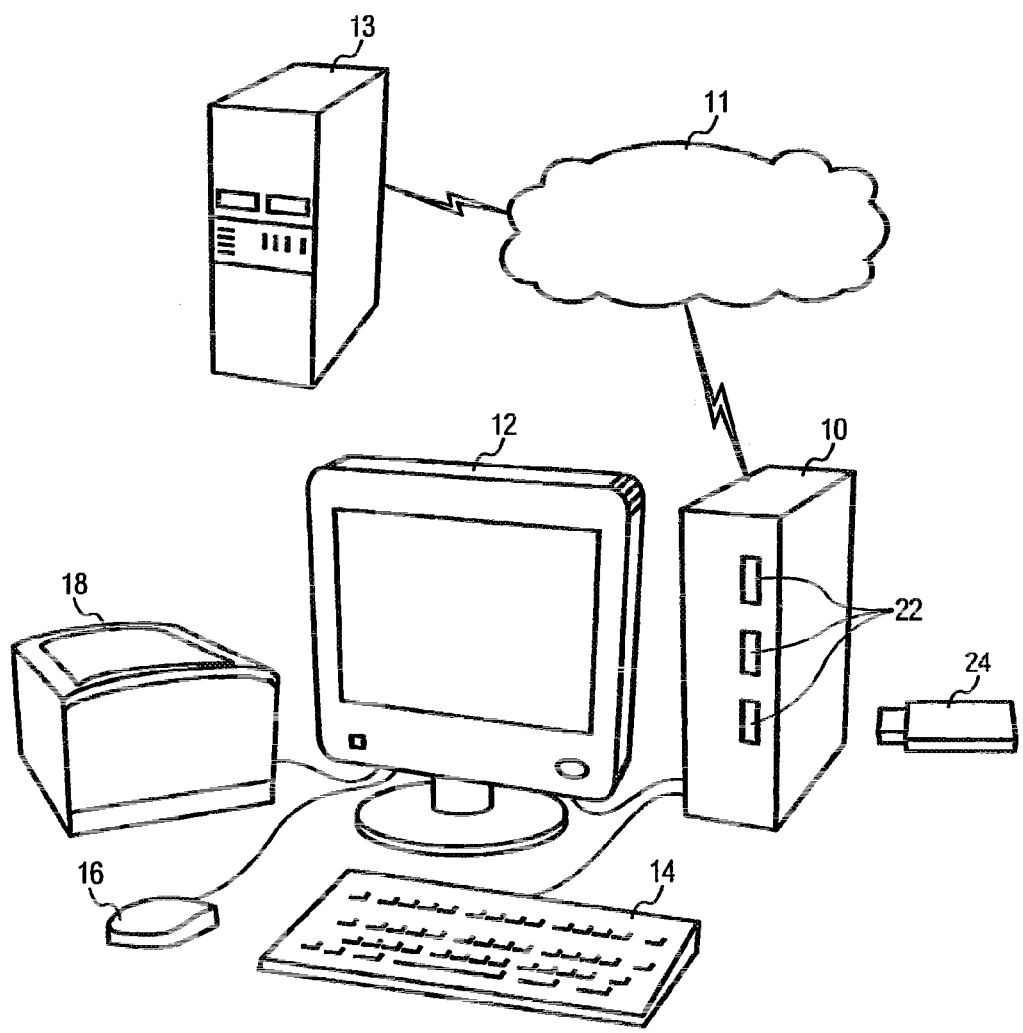
FIG. 1 is schematic illustration of a preferred form of computer system with which the preferred embodiment is to be used.

To refer to the FIG. 1, there is shown a normal computer system comprising a CPU 10, monitor 12, keyboard 14, mouse 16, and printer 18. Each of the peripheral devices 12, 14, 16 and 18 may be connected to the CPU 10 by cables 20, or wirelessly. The CPU 10 has a number of ports 22 to which a memory device 24 may be operatively connected. The computer CPU 10 is connected to a network 11 that is controlled by a system administrator 13.

Figure 2:
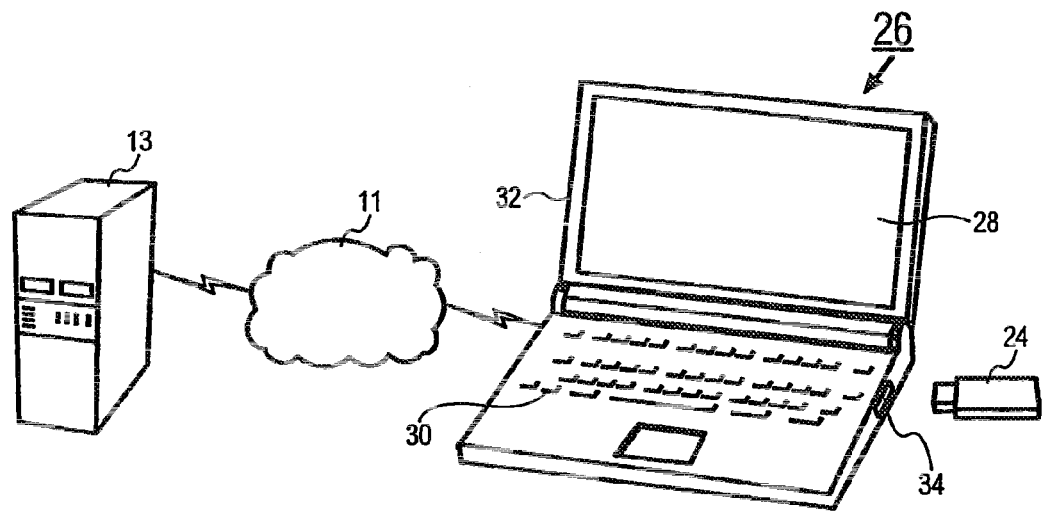
FIG. 2 is a schematic illustration of a second form of computer system which preferred embodiment is to be used.

FIG. 2 shows a laptop or notebook computer 26 having a display screen 28 and a keyboard 30 mounted within a hinged case 32. A number of ports 34 may be provided to which the memory device 24 may be operatively connected. The computer 26 is also connected to the network 11 that is controlled by the system administrator 13.

Figure 3:
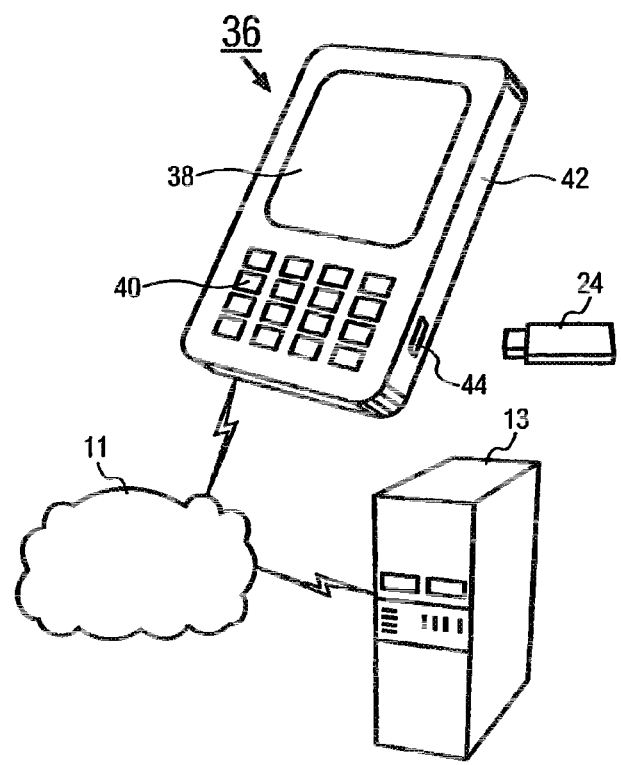
FIG. 3 is a schematic illustration of a third form of computer system which preferred embodiment is to be used.

FIG. 3 illustrates a personal digital assistant 36 having a display 38 and keypad 40 mounted within a casing 42. At least one port 44 may be provided for connection thereto by a peripheral or separable device—in this case the memory device 24. The personal digital assistant is also connected to the network 11 that is controlled by the system administrator 13.

Figure 4:
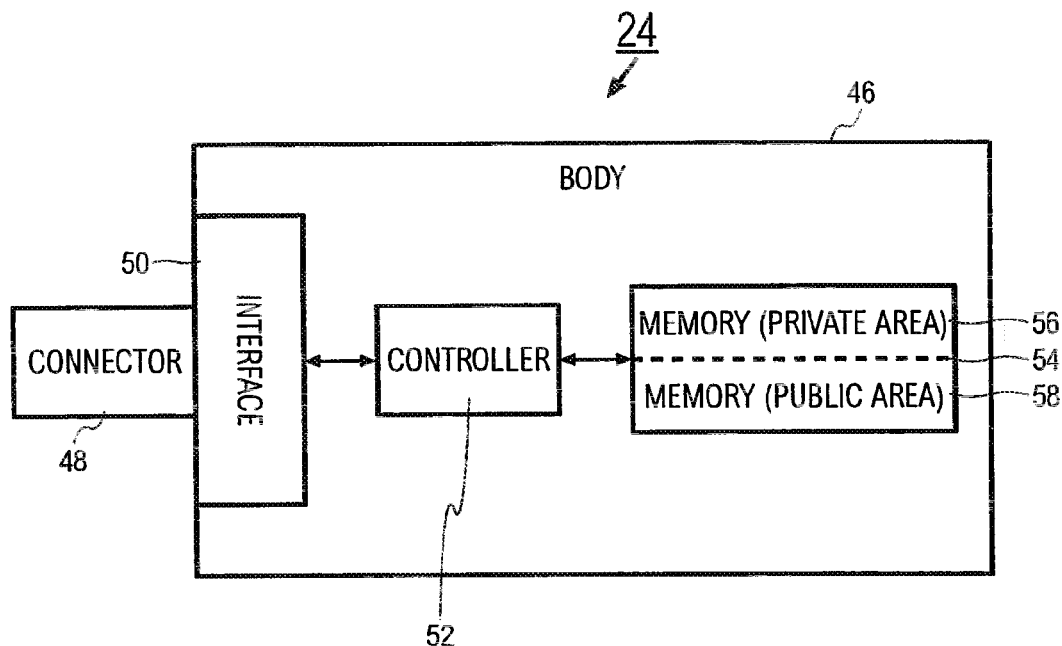
FIG. 4 is block diagram of a preferred form of peripheral device.
Figure 5:
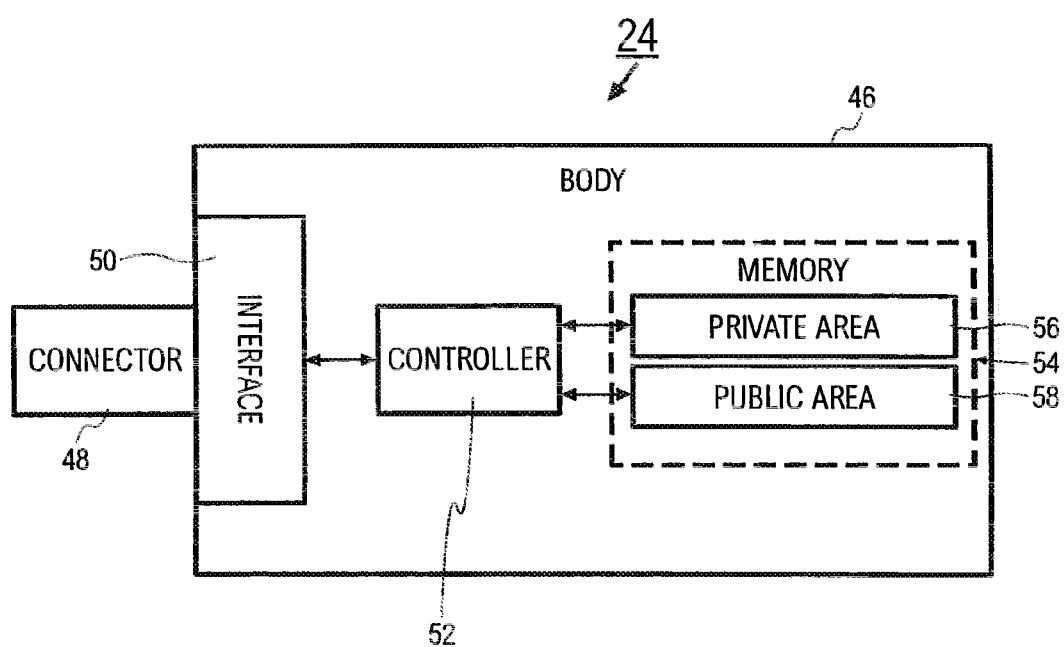
FIG. 5 is block diagram of an alternative form of peripheral device.

The memory device 24 is shown in FIGS. 4 and 5. It comprises a body 46 having a male connector 48 at one end. Mounted within the body 46 is an interface 50 for connector 48, a controller 52 operatively connected to interface 50, and non-volatile memory generally shown as 54. The memory 54 comprises a protected or private area 56 and a public area 58 that may be parts of the same physical memory (FIG. 4); or may be two (or more) physically separate memory devices (FIG. 5). The memory 54 may be a disk drive, flash memory, or otherwise. The connector 52 may be a USB or IEEE 1394 connector, or otherwise as required or desired. The protection or private area 56 may be used for the storage of confidential or private data or information.

Although the following description relates to the memory device 24, it applicable to all devices for attachment to a computer and that have a memory such as, for example, external disk drives, printers, games consoles, external read/write disk drives, external card readers, external USB hubs, external sound cards, media players, and MP3 players.

Due to the memory device 24 having the protected or private area 56, when the device 24 is connected to a corresponding port 22, 34, 44, the computer's operating system or application will block all relevant commands to the protected area 56 such as, for example, a password, as it doesn't recognize the protected area 56 due to setting by or instructions from the system administrator 13. As such, an administration right or privilege (hereinafter "administration privilege") is involved and the protected area 56 is in an administrative privilege environment. Such commands are usually SCSI commands.

To reduce the likelihood of this problem, and referring to FIG. 5, after the device 24 is operatively connected to host computer 10, 26, 36 hereinafter "host 10" (51), the host 10 sends a setup token to device 24 during the configuration descriptor request (52). During the enumeration of the device it enumerates as a composite device (53) that has two interfaces in the one device: one as a mass storage device (for public area 58) and one as a human interface device (for the private area 56). This will be as a part of the configuration descriptor. A human interface device does not require a device driver as the "WINDOWS"™ operating system has a devices driver for human interface devices.

During the string descriptor, the device 24 will report as the human interface device to the host 10 (54). As a consequence, the host 10 will request the report descriptor for the human interface device at (55).

The device 24 reports to the host 10 as an alphanumeric display in human interface device usage (56). It may report as other usages as required or desired. During the report descriptor process, feature report is used for communication between the device 24 and the host 10 (57). Alternatively, the input or output reports may be used. The report ID may be used as a command set and the mass storage operational code may be used as the report ID (58).

The host 10 commences the enumeration of device 24 (59). The device 24 is enumerated as a composite device (60) and therefore there will be no blockage of commands to the protected area 56 and thus the device 24 is able to accept commands for both the mass storage device (public) area 58 and the human interface device (private) area 56 (61). Each component 58, 56 is enumerated (63, 64) and when a mass storage command for either component 56, 58 is sent to device 24 (65, 66), the controller 52 is able to service and perform the task. After the tasks are performed, the process stops (67). As such the device 24 is operating in a non-administrative privilege environment and the system administrator 13 is not able to block commands to the protected area 56.

Figure 6:
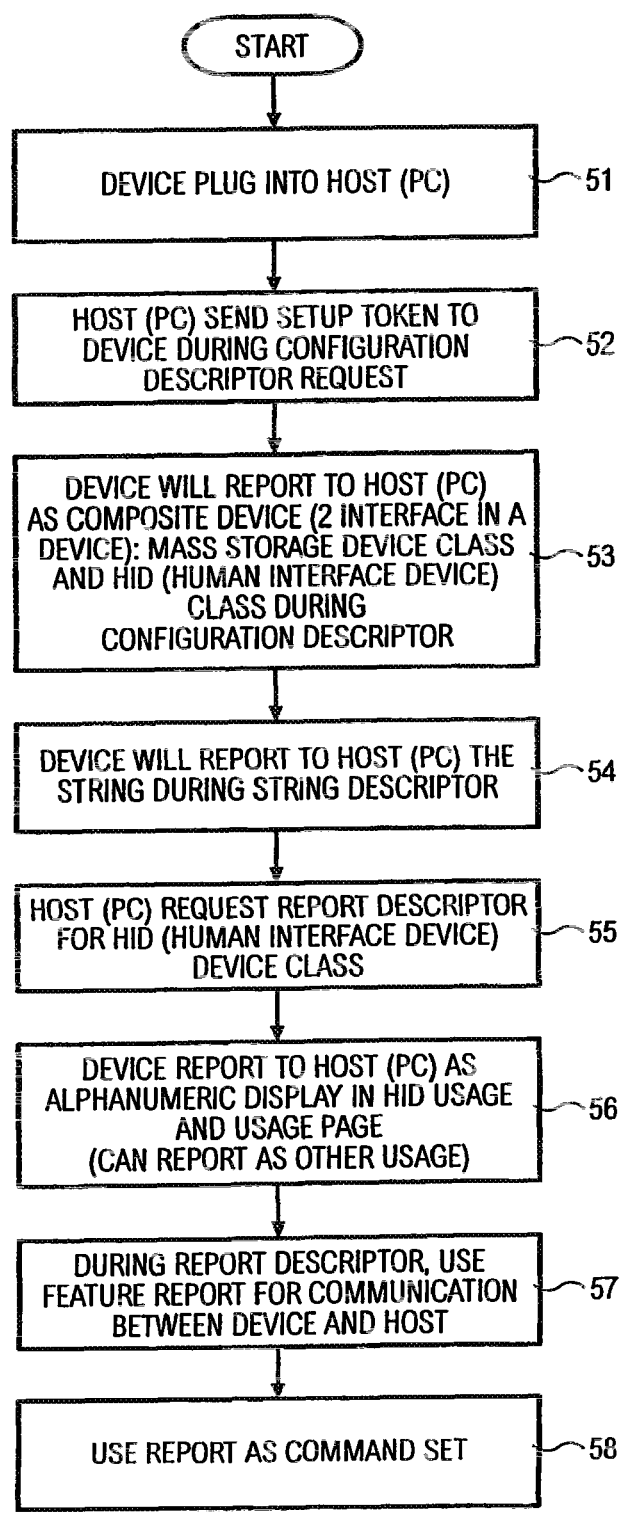
FIG. 6 is a flow chart of the operation of the preferred embodiment in the three preferred forms of computer systems.
Figure 7:
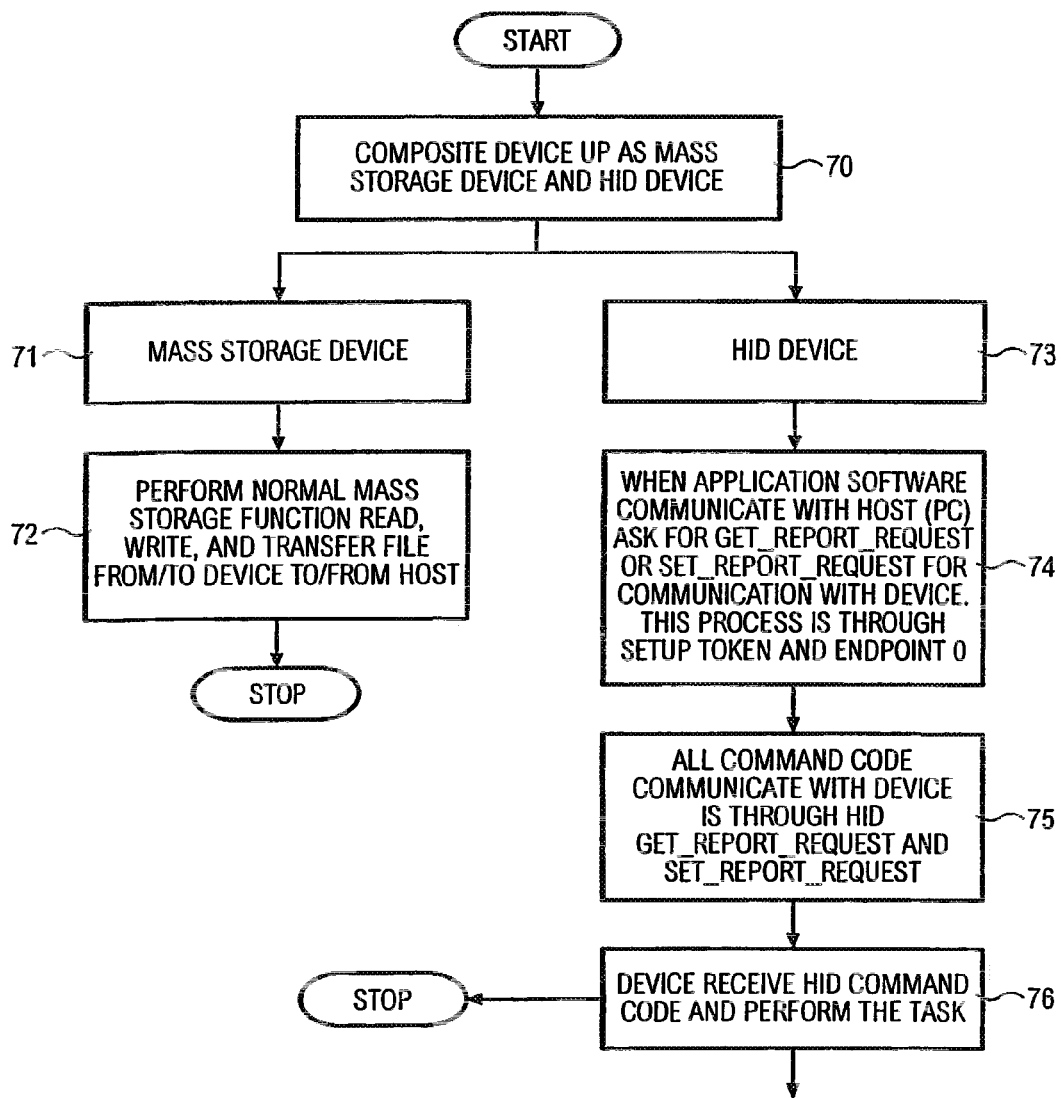
FIG. 7 is a flow chart for the operation of the preferred embodiment a peripheral device.
Figure 7:
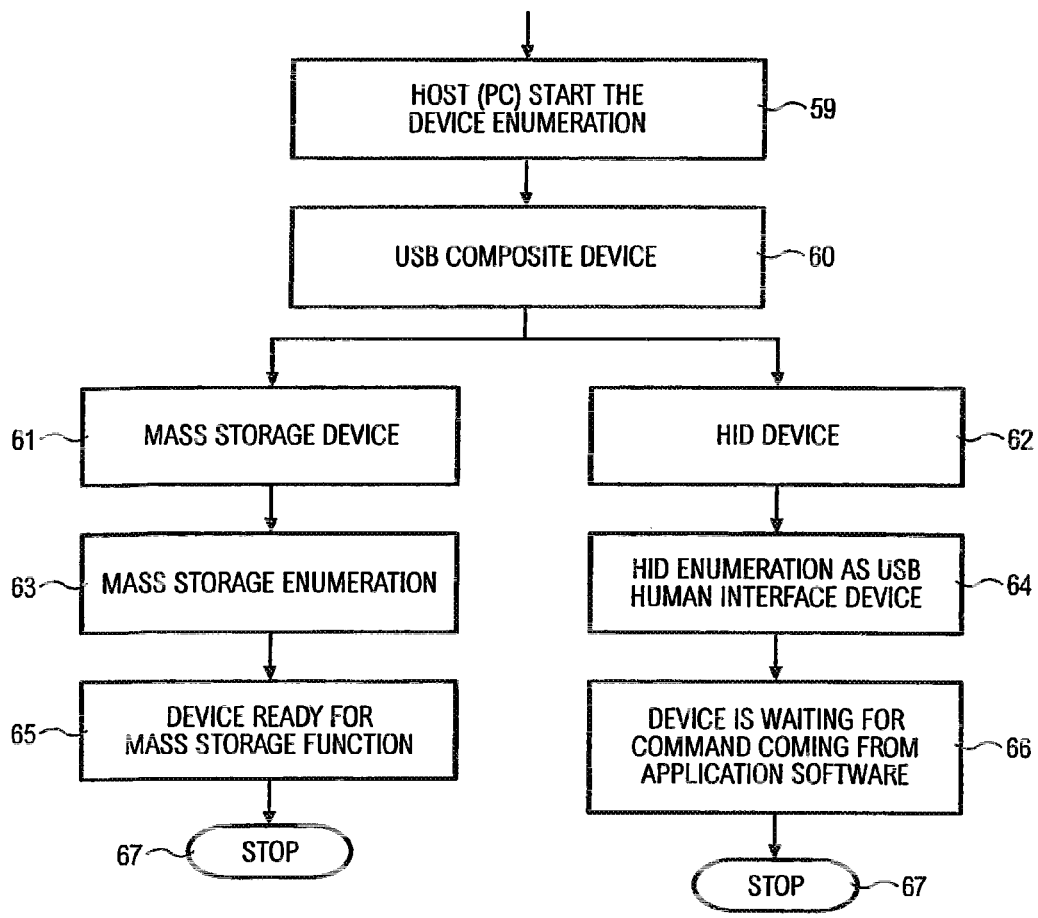

FIG. 6 shows the process as it occurs on the device 24. Here, the composite device 24 is the mass storage (public) device 58 and the human interface (private) device 56 (70). The mass storage (public) device 58 (71) can perform all normal mass storage functions: read, write, transfer files to and from host 10, and so forth (72).

For the human interface (private) device 56 (73), when the controller 52 communicates with host 10 (74) it will ask for get-report-request or set-report-request to enable communication between host 10 and device 24 for the human interface (private) device 56. This will normally be through setup token and endpoint 0. All command codes communication with the device 24 for the human interface (private) device 56 is through the human interface get-report-request and set-report-request (75). The device 24 receives the human interface commands code (76) and performs the necessary task. As the command code is under a non-administrative privilege environment, the operating system of host 10 is not able to block the human interface (private) device 56. Communication between the host computer 10 application and the private area 56 may be through a mass storage driver. As such the device 24 is operating in a non-administrative privilege environment and the system administrator 13 is not able to block commands to the protected area 56.

Whilst there has been described in the foregoing description preferred embodiments of the present invention, it will be understood by those skilled in the technology that many variations or modifications in details of design or construction or operation may be made without departing from the present invention.

What is claimed:

1. A method of overcoming system administrator blockage of a non-volatile memory device newly-connected to a host computer operatively connected to a network controllable by a system administrator, the non-volatile memory device having a first non-volatile memory comprising a public memory and a private memory, the private memory being of a category for which communication by a host computer application is able to be blocked in an administrative privilege environment, the method comprising:

operatively connecting the non-volatile memory device to the host; and enumerating the non-volatile memory device with the host computer application as a composite device including a human interface device for enabling communication between the host computer application and the private memory in a non-administrative privilege environment.

2. A method as claimed in claim 1, wherein the communication between the host computer application and the private memory is through a mass storage driver.

3. A method as claimed in claim 1, wherein the non-volatile memory device enumerates itself as the human interface device during the configuration descriptor process.

4. A method as claimed in claim 3, wherein a feature report is used for communication between the non-volatile memory device and the host computer application.

5. A method as claimed in claim 4, wherein the non-volatile memory device reports to the host computer application as an alphanumeric display in a usage selected from the group consisting of human interface device usage and a usage page.

6. A method as claimed in claim 1, wherein the public memory is able to communicate with the host computer application in the non-administrative privilege environment.

7. A method as claimed in claim 6, wherein the composite device is a non-volatile memory external device for operative connection to the host computer, the non-volatile memory external device comprising the public memory and the private memory.

8. A method as claimed in claim 1, wherein the public memory and the private memory comprise separate parts of a single memory.

9. A method as claimed in claim 1, wherein the non-volatile memory device is selected from the group consisting of an external disk drive, a printer, a game console, an external read/write disk drive, an external card reader, an external USB hub, an external sound card, a media player, and a MP3 player.

10. A computer usable medium having stored thereon a computer program code that is configured to cause a processor to execute one or more functions for the performance of the method of claim 1.

11. A non-volatile memory device for operative connection to a host computer, and having stored thereon a computer program code that is configured to cause a processor to execute one or more functions for the performance of the method of claim 1.

12. A non-volatile memory device for connecting to a host computer operatively connected to a network controllable by a system administrator, the non-volatile memory device comprising:

(a) a public memory;

(b) a private memory, the private memory being of a category for which communication by a host computer application is able to be blocked in an administrative privilege environment;

(c) a connector to enable connection of the non-volatile memory device to the host computer; and (d) a connector interface;

wherein the non-volatile memory device is able to be enumerated with a host computer application as a composite device including a human interface device for enabling communication between the host computer application and the private memory in a non-administrative privilege environment.

13. A non-volatile memory device as claimed in claim 12, wherein the private memory and the host computer application communicate through a mass storage driver.

14. A non-volatile memory device as claimed in claim 12, wherein the public memory is able to communicate with the host computer application in the non-administrative privilege environment.

15. A non-volatile memory device as claimed in claim 12, wherein the connector is selected from the group consisting of: USB, and IEEE 1394.

16. A non-volatile memory device as claimed in claim 12, wherein the public memory and the private memory comprise parts of a single memory.

17. A non-volatile memory device as claimed in claim 12, further comprising a controller for controlling the public memory and the private memory as well as communication between the host computer and the non-volatile memory device.

* * * * *